United States Patent [19]

Schnellmann

[11] Patent Number: 4,891,162

[45] Date of Patent: Jan. 2, 1990

[54] MACHINING FLUID FOR ELECTRICAL DISCHARGE MACHINING APPARATUS

[75] Inventor: Danielle Schnellmann, St-Julien en Genevois, France

[73] Assignee: Charmilles Technologies SA, Geneva, Switzerland

[21] Appl. No.: 170,033

[22] Filed: Mar. 21, 1988

Related U.S. Application Data

[63] Continuation of Ser. No. 631,446, Jul. 16, 1984, abandoned.

[30] Foreign Application Priority Data

Jul. 29, 1983 [CH] Switzerland .......................... 4165/83

[51] Int. Cl.⁴ .......................... H01B 3/02; B23K 9/16
[52] U.S. Cl. .................... 252/570; 219/69.14; 252/11; 252/34; 252/49.3; 252/77; 252/117; 252/118
[58] Field of Search .................. 252/11, 34, 49.3, 77, 252/117, 118, 570; 219/690

[56] References Cited

U.S. PATENT DOCUMENTS

| | | | |
|---|---|---|---|
| 2,303,551 | 12/1942 | Houghton | 252/118 |
| 2,456,947 | 12/1948 | Jernstedt | 252/118 |
| 3,334,210 | 8/1967 | Williams et al. | 219/69 D |
| 3,869,399 | 3/1975 | Collins | 252/117 |
| 3,928,163 | 12/1975 | Ullmann et al. | 219/69 D |
| 4,313,837 | 2/1982 | Vukasovich et al. | 252/49.3 |
| 4,551,602 | 11/1985 | Inoue et al. | 219/69 D |

FOREIGN PATENT DOCUMENTS 958477 9/1982 U.S.S.R. .

*Primary Examiner*—Robert A. Wax
*Attorney, Agent, or Firm*—Gifford, Groh, Sheridan, Sprinkle and Dolgorukov

[57] ABSTRACT

An electrical discharge machining fluid consisting principally of de-ionized water and a triethanolamine salt, the latter being at a concentration of 0.2% to 10% by volume.

The method for preparing the machining fluid consists in adding to the de-ionized water, under vigorous stirring, from 0.2% to 10% by volume of a mixture of triethanolamine and a fatty acid. The machining fluid of the invention permits to operate at an increased machining speed and to obtain clean machined surfaces.

20 Claims, No Drawings

MACHINING FLUID FOR ELECTRICAL DISCHARGE MACHINING APPARATUS

This is a continuation of copending application Ser. No. 631,446 filed on July 16, 1984, now abandoned.

BACKGROUND OF THE INVENTION

The present application relates to a composition of machining fluid for EDM apparatus in general and more particularly to a composition for improving machining conditions and the speed of machining.

A machining fluid is used in the course of electrical discharge machining of an electrode workpiece by means of an electrode tool, the machining fluid being in the form of a liquid supplied under pressure to the machining zone between the two electrodes. The machining fluid sometimes consists of a mixture of de-ionized water and one or more additives.

SUMMARY OF THE INVENTION

The present invention has for an object to provide a machining fluid for EDM apparatus permitting to improve the machining conditions and more particularly permitting to increase the machining speed of the apparatus.

The invention provides a machining fluid consisting principally of a mixture of de-ionized water and one additive, characterized in that the additive is a triethanolamine salt at a concentration of 0.2% to 10% by volume.

The invention is also addressed to a method of preparing such a machining fluid.

DETAILED DESCRIPTION OF THE PREFERRED EMBODIMENT

According to a preferred method of preparing the machining fluid of the invention, the machining fluid is prepared by adding a mixture of triethanolamine and oleic acid to de-ionized water while vigorously agitating the solution. Good results are achieved by using the resulting machining fluid in EDM apparatus wherein an electrode workpiece is cut by electrical discharges by way of an electrode wire, the machining fluid having one part by volume of triethanolamine and five parts by volume of oleic acid, the mixture of triethanolamine and oleic acid being added to the water at a concentration of 0.4% by volume.

Triethanolamine is a weak base which acts as an antirust additive when included, in small concentration, in water-based dielectric EDM fluids, and which increases the pH of the solution. The hydrogen ions concentration is decreased, which strongly decreases the precipitation of hydrogen upon electronegative iron, thus avoiding oxidation.

The presence of triethanolamine $C_6H_{15}NO^3$ which is water soluble, and of oleic acid, $C_{18}H_{34}O_2$, which is water insoluble, causes the formation of a triethanolamine salt according to the following equation:

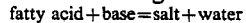

fatty acid + base = salt + water

The salt is a soap resulting from the fact that the oleic acid is a fatty acid.

Oleic acid presents the advantage over other fatty acids, which could also be used, of being liquid at ambient temperature, which facilitates the preparation of the mixture.

The reaction is never complete and the salt which is formed remains mixed with an excess of fatty acid and triethanolamine. The remaining oleic acid is maintained in a stable emulsion in the water by the soap, such that the respective proportions of oleic acid and triethanolamine are not critical.

It is also possible to use a triethanolamine di-oleate, a well-known soap, which becomes hydrolyzed in water rather than becoming ionized, thus reforming in part some oleic acid and triethanolamine.

It is advantageous to add to the dielectric fluid at least one surfactant, or surface tension active, additive, whose effect it is to encourage coating of the solid particles removed during machining by a thin film that reduces the surface tension between the water and the solid particles, thus improving the carrying away of the particles by the dielectric flow and considerably decreasing the possibility of the solid particles re-adhering to the walls of the cut in the workpiece.

The fact that the solid particles are inhibited against re-adhering to the walls of the machined cut results in an increase of the electrical discharge machining gap, which in turn permits to operate at a greater cutting speed.

It has been observed that, after cleaning the machined workpiece, for example by means of a simple detergent, the surfaces of the cut have an attractive shiny appearance, greatly superior to what is obtained as a result of machining with tap water or an oil dielectric.

In order for the triethanolamine to be sufficiently effective, it is critical that the triethanolamine salt be added in a proportion of at least 0.2% by volume in the de-ionized water. The specific conductivity of the machining fluid is of the order of $10^{-5}$ mho/cm.

Finally, it has been observed that the exact concentration of triethanolamine salt depends upon the kind of machining which is effected. In practice, for cutting by means of an electrode wire, the concentration of triethanolamine salt is between 1% and 10%. Beyond 10% of concentration of triethanolamine salt, the machining fluid becomes too conductive and good results are no longer achieved.

The machining fluid according to the invention presents the additional advantage of having a tendency to form a mud in the cut, right after passage of the electrode wire. Such an effect is useful and advantageous because the mud adheres to the walls of the cut with enough strength to hold the portion cut off from the workpiece and prevent its fall at the end of a cut. It is thus unnecessary to provide additional means for supporting the portion cut from the workpiece.

If the formation of the mud is undesirable, it is sufficient to add cyclohexanol to the machining fluid in a concentration of 0.2% to 10% by volume, preferably in the same proportion as the concentration of triethanolamine, in order to lessen the possibility of mud forming.

As indicated previously, the machining fluid of the present invention consists principally of essentially of only the triethanolamine salt in deionized water; that is, there is no constituent present in the deionized water other than the triethanolamine salt which materially affects or contributes to the conductivity of the machining fluid. Of course, by definition the deionized water provides only an insignificant number of ions of high mobility which might contribute to the conductivity of the machining fluid. Other additives useful for the practice of EDM methods, such as the cyclohexanol mentioned above, may be included so long as such materials do not significantly affect the conductivity provided by the triethanolamine salt.

Having thus described the present invention, modifications whereof will be apparent to those skilled in the art, what is claimed as new is as follows:

1. An electrical discharge machining method including the steps of disposing an EDM machining fluid between an EDM electrode and an EDM workpiece, and machining said workpiece by electrical discharge, wherein said EDM machining fluid is a dielectric liquid which comprises 0.2% to 10% by volume of a salt of triethanolamine and a fatty acid in deionized water.

2. The method of claim 1, wherein said dielectric liquid further comprises 0.2% to 10% by volume cyclohexanol.

3. The method of claim 1, wherein said fatty acid comprises oleic acid.

4. The method of claim 1, wherein said salt comprises a di-oleate.

5. The method of claim 1, further comprising the step of preparing said dielectric liquid by subjecting deionized water to strong mechanical stirring and simultaneously introducing therein a mixture of 0.2% to 10% by volume triethanolamine and a fatty acid.

6. The method of claim 5, wherein said mixture comprises substantially one part by volume triethanolamine and five parts by volume oleic acid.

7. The method of claim 5, wherein said mixture is introduced at a concentration of 0.4% by volume.

8. A dielectric machining fluid for electrical discharge machining comprising a mixture of deionized water and at least one additive, said additive being a salt of triethanolamine and a fatty acid at a concentration of 0.2% to 10% by volume.

9. The machining fluid of claim 8 having an electrical specific conductivity of the order of $10^{-5}$ mho/cm.

10. The machining fluid of claim 8 further comprising cyclohexanol in a concentration of 0.2% to 10% by volume.

11. The machining fluid of claim 8 wherein said additive is a salt of oleic acid.

12. The machining fluid of claim 8 wherein the said additive is a dioleate.

13. The machining fluid of claim 8, which comprises 1 part by volume of triethanolamine and 5 parts by volume of oleic acid.

14. An electrical discharge machining method wherein the machining fluid circulating between the electrode tool and the workpiece is a dielectric liquid which comprises 0.2% to 10% by volume of a salt of triethanolamine and a fatty acid in deionized water.

15. The method of claim 14, wherein said dielectric fluid further comprises 0.2% to 10% by volume cyclohexanol.

16. The method of claim 14, wherein said fatty acid comprises oleic acid.

17. The method of claim 14, wherein said dielectric liquid has an electrical specific conductivity of the order of $10^{-5}$ mho/cm.

18. The method of claim 14, wherein said salt comprises a dioleate.

19. The method of claim 14, wherein said dielectric liquid has been obtained from a mixture comprising substantially 1 part by volume triethanolamine and 5 parts by volume oleic acid.

20. The invention according to claim 1 wherein said fluid has an electrical specific conductivity on the order of $10^{-5}$ mho/cm.

* * * * *